(12) United States Patent
Ott

(10) Patent No.: US 11,143,258 B2
(45) Date of Patent: Oct. 12, 2021

(54) SPIRAL INERTIA TRACK VIBRATION ABSORBER

(71) Applicant: ITT MANUFACTURING ENTERPRISES LLC, Wilmington, DE (US)

(72) Inventor: Mark Ott, Orchard Park, NY (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 15 days.

(21) Appl. No.: 16/566,123

(22) Filed: Sep. 10, 2019

(65) Prior Publication Data

US 2021/0071733 A1   Mar. 11, 2021

(51) Int. Cl.
*F16F 7/10* (2006.01)

(52) U.S. Cl.
CPC .......... *F16F 7/1005* (2013.01); *F16F 7/1034* (2013.01); *F16F 2222/08* (2013.01); *F16F 2228/066* (2013.01)

(58) Field of Classification Search
CPC .... F16F 7/1005; F16F 7/1034; F16F 2222/08; F16F 2228/066
See application file for complete search history.

(56) References Cited

U.S. PATENT DOCUMENTS

| 4,909,490 | A | * | 3/1990 | de Fontenay | F16F 13/262 267/140.13 |
| 5,197,692 | A | * | 3/1993 | Jones | B64D 27/18 188/320 |
| 2008/0142633 | A1 | * | 6/2008 | McGuire | B64C 27/001 244/17.27 |
| 2013/0037362 | A1 | * | 2/2013 | Gartner | F16F 7/1034 188/378 |
| 2015/0192184 | A1 | * | 7/2015 | Yamada | F16F 9/3484 188/322.15 |
| 2016/0369867 | A1 | * | 12/2016 | Leonard | F16D 3/12 |
| 2019/0186581 | A1 | * | 6/2019 | Roessle | F16F 9/062 |
| 2020/0102998 | A1 | * | 4/2020 | Aoki | F16F 9/369 |

\* cited by examiner

*Primary Examiner* — Vishal R Sahni
(74) *Attorney, Agent, or Firm* — Hertzberg, Turk, & Associates, LLC

(57) ABSTRACT

Technologies are described for devices to absorb vibration. The devices may comprise an inertia track housing, an inertia track fluid reservoir, and an inertia track body. The inertia track fluid reservoir and the inertia track body may be within the inertia track housing. Walls of the inertia track body may define a first and a second spiral inertia track. The first and second spiral inertia tracks may be spiral channels within the outer surface of the inertia track body. The first spiral inertia track may connect a first fluid reservoir with the inertia track fluid reservoir. The second spiral inertia track may connect a second fluid reservoir with the inertia track fluid reservoir. The first and second spiral inertia tracks may be configured to channel the flow of a fluid along the first spiral inertia track and the second spiral inertia track and interact with the fluid to absorb vibration.

14 Claims, 6 Drawing Sheets

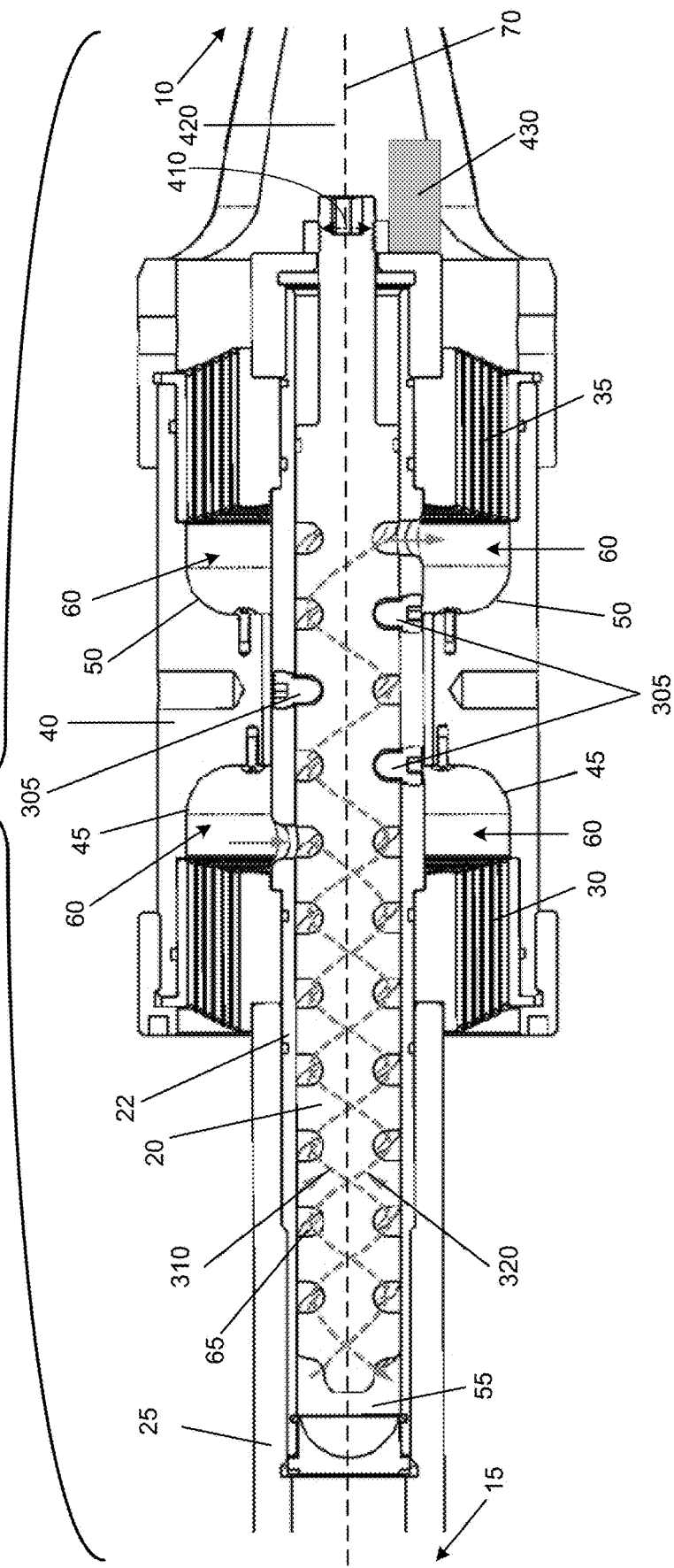

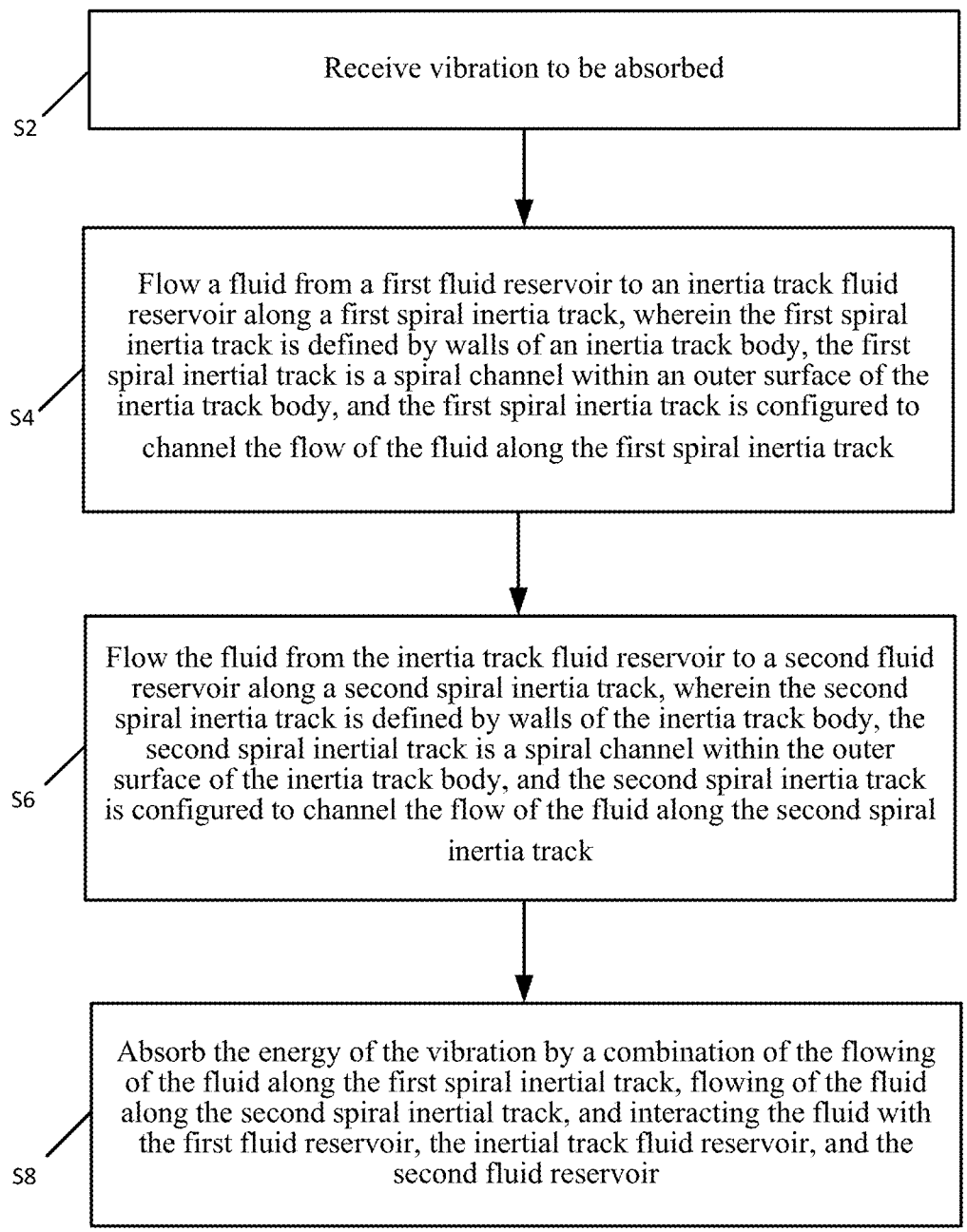

SPIRAL INERTIA TRACK VIBRATION ABSORBER

BACKGROUND

Unless otherwise indicated herein, the materials described in this section are not prior art to the claims in this application and are not admitted to be prior art by inclusion in this section.

A vibration absorber may be a mechanical or hydraulic device to absorb or dissipate kinetic energy. A vibration absorber may absorb kinetic energy from an impact, movement, or a vibration. Fluid may move within a vibration absorber to absorb or dissipate kinetic energy.

SUMMARY

One embodiment of the invention is a device, which is statically stiff to support high loads, but dynamically soft to provide vibration attenuation. The device may comprise an inertia track housing. The device may comprise an inertia track fluid reservoir. The inertia track fluid reservoir may be within the inertia track housing. The device may comprise an inertia track. The inertia track body may be within the inertia track housing. The inertia track body may include walls. The walls may define a first spiral inertia track fluid path and a second spiral inertia track fluid path within the outer surface of the inertia track body. The first spiral inertia track and the second spiral inertia track may be spiral channels within the outer surface of the inertia track body. The first spiral inertia track may connect a first fluid reservoir with the inertia track fluid reservoir. The second spiral inertia track may connect a second fluid reservoir with the inertia track fluid reservoir. The first spiral inertia track may be configured to channel the flow of a fluid along the first spiral inertia track. The second spiral inertia track may be configured to channel the flow of a fluid along the second spiral inertia track. A combination of the flow of the fluid along the first spiral inertial track, the flow of the fluid along the second spiral inertial track, and an interaction of the fluid with the first fluid reservoir, the inertial track fluid reservoir, and the second fluid reservoir, may be effective to absorb the vibration.

Another embodiment of the invention includes a method for a vibration isolation device, which is statically stiff to support high loads, but dynamically soft. The method may comprise receiving vibration to be absorbed. The method may comprise flowing a fluid from a first fluid reservoir to an inertia track fluid reservoir along a first spiral inertia track. The first spiral inertia track may be defined by walls of an inertia track body. The first spiral inertial track may be a spiral channel within an outer surface of the inertia track body. The first spiral inertia track may be configured to channel the flow of the fluid along the first spiral inertia track. The method may comprise flowing the fluid from the inertia track fluid reservoir to a second fluid reservoir along a second spiral inertia track. The second spiral inertia track may be defined by walls of the inertia track body. The second spiral inertial track may be a spiral channel within the outer surface of the inertia track body. The second spiral inertia track may be configured to channel the flow of the fluid along the second spiral inertia track. The method may comprise absorbing the vibration by a combination of the flowing of the fluid along the first spiral inertial track, flowing of the fluid along the second spiral inertial track, and interacting the fluid with the first fluid reservoir, the inertial track fluid reservoir, and the second fluid reservoir.

Another embodiment of the invention is a system, which is statically stiff to support high loads, but dynamically soft to provide vibration attenuation. The system may comprise a static object. The system may comprise a vibrating object. The system may comprise a housing. A first end of the housing may be attached to a first end. The first end may be attached to the static object. The system may comprise a first plunger seal. The first plunger seal may be housed within the housing. The system may comprise a second plunger seal. The second plunger seal may be housed within the housing. The system may comprise a first fluid reservoir. Walls of the housing may define the first fluid reservoir. The first fluid reservoir may be adjacent to the first plunger seal. The system may comprise a second fluid reservoir. Walls of the housing may define the second fluid reservoir. The second fluid reservoir may be adjacent to the second plunger seal. The system may comprise a strut arm. A first end of the strut arm may be secured to the first piston seal. A second end of the strut arm may be attached to a mobile end. The mobile end may be attached to the vibrating object. The system may comprise an inertia track housing. The inertia track housing may be attached to inner edges of the first plunger seal and inner edges of the second plunger seal. The inertia track housing may be in contact with the strut arm. The system may comprise an inertia track fluid reservoir. The inertia track fluid reservoir may be within the inertia track housing. The system may comprise an inertia track body. The inertia track body may be within the inertia track housing. The inertia track body may include walls. The walls may define a first spiral inertia track and a second spiral inertia track within the outer surface of the inertia track body. The first spiral inertia track and the second spiral inertia track may be spiral channels within the outer surface of the inertia track body. The first spiral inertia track may connect a first fluid reservoir with the inertia track fluid reservoir. The second spiral inertia track may connect a second fluid reservoir with the inertia track fluid reservoir. The first spiral inertia track may be configured to channel the flow of a fluid along the first spiral inertia track. The second spiral inertia track may be configured to channel the flow of a fluid along the second spiral inertia track. A combination of the flow of the fluid along the first spiral inertial track, the flow of the fluid along the second spiral inertial track, and an interaction of the fluid with the first fluid reservoir, the inertial track fluid reservoir, and the second fluid reservoir, may be effective to absorb the vibration. The system may comprise the fluid. The first fluid reservoir, the second fluid reservoir, the inertia track fluid reservoir, the first spiral inertia track, and the second spiral inertia track may hold the fluid.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 is a side cutout view of a spiral inertia track vibration absorber;

FIG. 6 illustrates a flow diagram for an example process to absorb vibration, all arranged according to at least some embodiments described herein.

DETAILED DESCRIPTION

Figure 1:
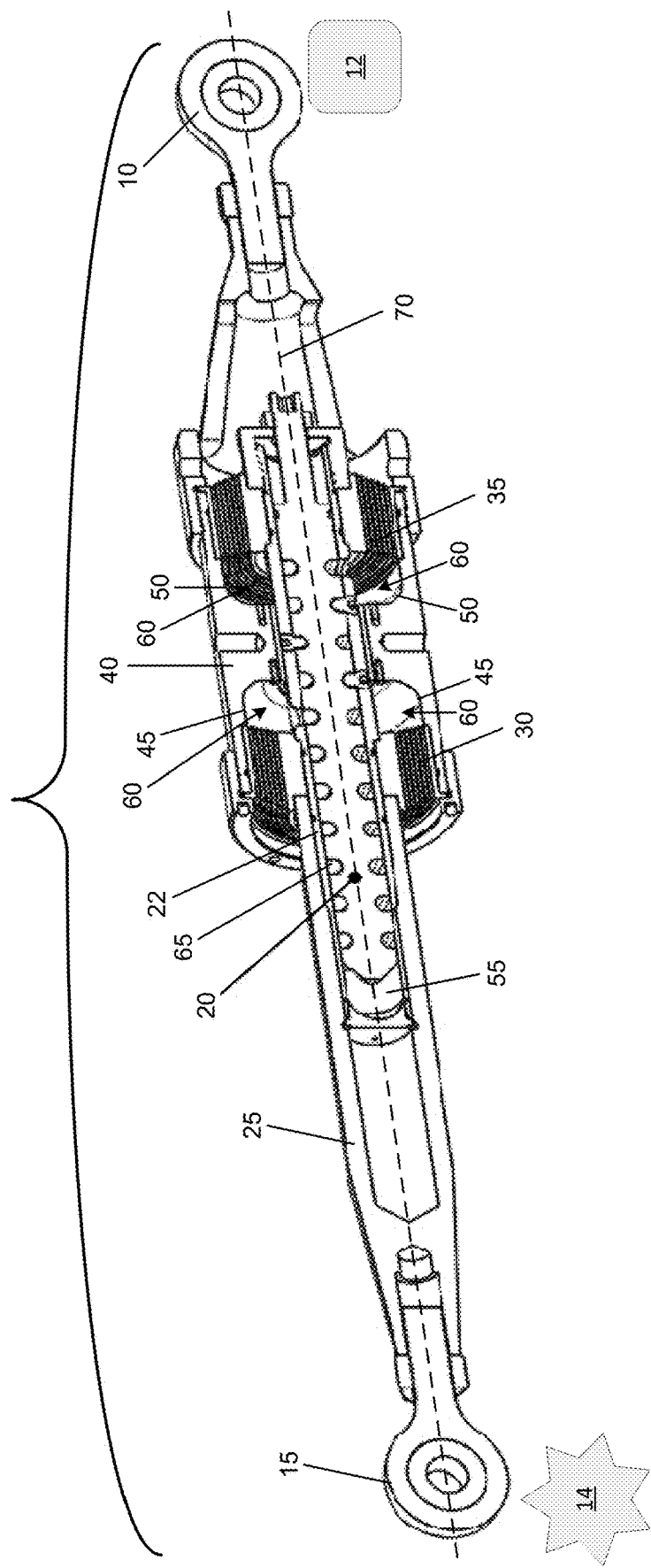
FIG. 1 is a side cutout view of a spiral inertia track vibration absorber.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a side cutout view of a spiral inertia track vibration absorber, arranged in accordance with at least some embodiments described herein. Spiral inertia track vibration absorber 100 may include a stationary end 10, a mobile end 15, an inertia track body 20, an inertia track housing 22, a strut arm 25, a first elastomeric plunger seal 30, a second elastomeric plunger seal 35, a housing 40, a fluid reservoir 45, a fluid reservoir 50, and an inertia track fluid reservoir 55. Housing 40 may have an essentially cylindrical shape and a first end of housing 40 may be attached to stationary end 10. Stationary end 10 may be configured to be attachable and removable from a static object or structure 12. Mobile end 15 may be attached to a moving or vibrating object 14. In this example, stationary end 10 is attached to housing 40 and mobile end 15 is attached to strut arm 25, however, stationary end 10 and mobile end 15 could be transposed, with stationary end 10 attached to strut arm 25 and mobile end 15 attached to housing 40.

First elastomeric plunger seal 30 and second elastomeric plunger seal 35 may be housed within housing 40. Walls of housing 40 may define fluid reservoir 45 and fluid reservoir 50. Fluid reservoir 45 may be adjacent to first elastomeric plunger seal 30. Fluid reservoir 50 may be adjacent to second elastomeric plunger seal 35.

First elastomeric plunger seal 30 and second elastomeric plunger seal 35 may be ring shaped and may include multiple ring shaped layers of bonded elastomeric buffer absorbers with different layers having different modulus values. An outer edge of first elastomeric plunger seal 30 and second elastomeric plunger seal 35 may be in contact with housing 40 and an inner edge of first elastomeric plunger seal 30 and second elastomeric plunger seal 35 may be in contact with inertia track housing 22. At least a portion of a first end of strut arm 25 may be secured to the inner edge of first elastomeric plunger seal 30. Strut arm 25 may extend out from a second end of housing 40 along a central axis 70 of housing 40. A second end of strut arm 25 may be attached to mobile end 15. At least a portion of strut arm 25 may be in contact with inertia track housing 22. Inertia track housing 22 may house inertia track fluid reservoir 55 and inertia track body 20.

Fluid reservoir 45, fluid reservoir 50, and inertia track fluid reservoir 55 may hold a fluid 60. Fluid 60 may have a high density and a low viscosity, such as a heavy fluid, hydraulic fluid, or other fluid. Inertia track body 20 may include walls which define spiral channels or flutes 65 within an outer surface of inertia track body 20.

Fluid 60 may flow through flutes 65 between fluid reservoir 40, inertia track fluid reservoir 55, and fluid reservoir 50 as strut arm 25 moves in and out of housing 40 along axis 70 of housing 40. As shown in more detail below, spiral track vibration absorber 100 may absorb vibration as fluid 60 flows through and interacts with flutes 65 defined by walls of inertia track body 20.

Figure 2:
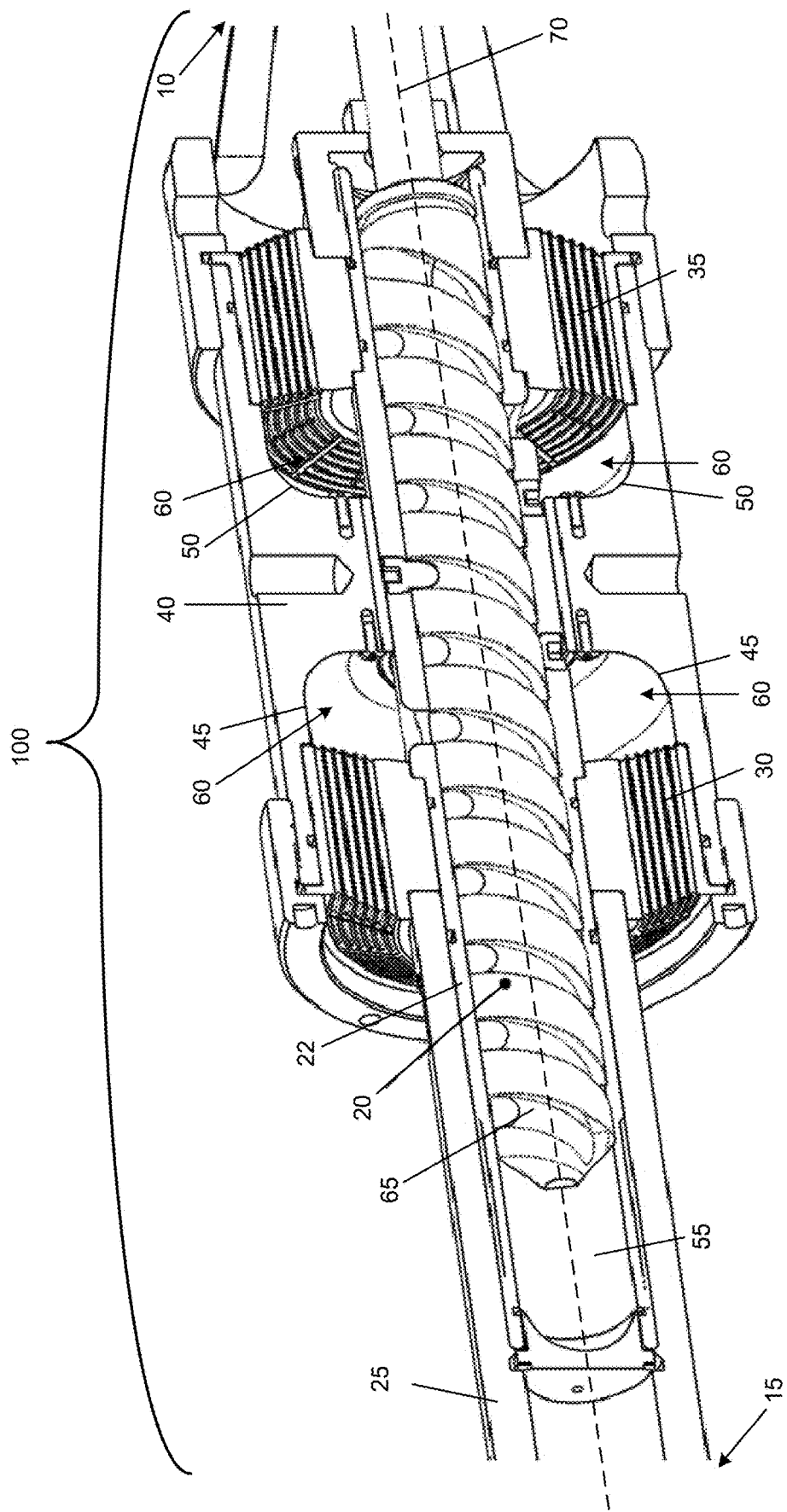
FIG. 2 is a side cutout view of a spiral inertia track vibration absorber with a side view of an inertia track body.

FIG. 2 is a side cutout view of a spiral inertia track vibration absorber with a side view of inertia track body 20, arranged in accordance with at least some embodiments described herein. Those components in FIG. 2 that are labeled identically to components of FIG. 1 will not be described again for the purposes of brevity.

As shown in FIG. 2, flutes 65 may be defined by walls of inertia track body 20 as two helix or spiral channels within an outer surface of inertia track body 20. Flutes 65 may be defined by walls of inertia track body 20 with a channel cross section in the shape of a half circle, a half ellipse, a square, a rectangle, a triangle or any other geometric shape. When strut arm 25 is impacted, moved, or vibrated, strut arm 25 may move in and/or out of housing 40 along axis 70 of housing 40. When strut arm 25 moves in and/or out of housing 40 along axis 70 of housing 40, fluid 60 may flow through channels of flutes 65 between fluid reservoir 40, inertia track fluid reservoir 55, and fluid reservoir 50. Fluid 60 flowing through channels of flutes 65 between fluid reservoir 40, inertia track fluid reservoir 55, and fluid reservoir 50 may absorb vibration of strut arm 25.

Figure 3:
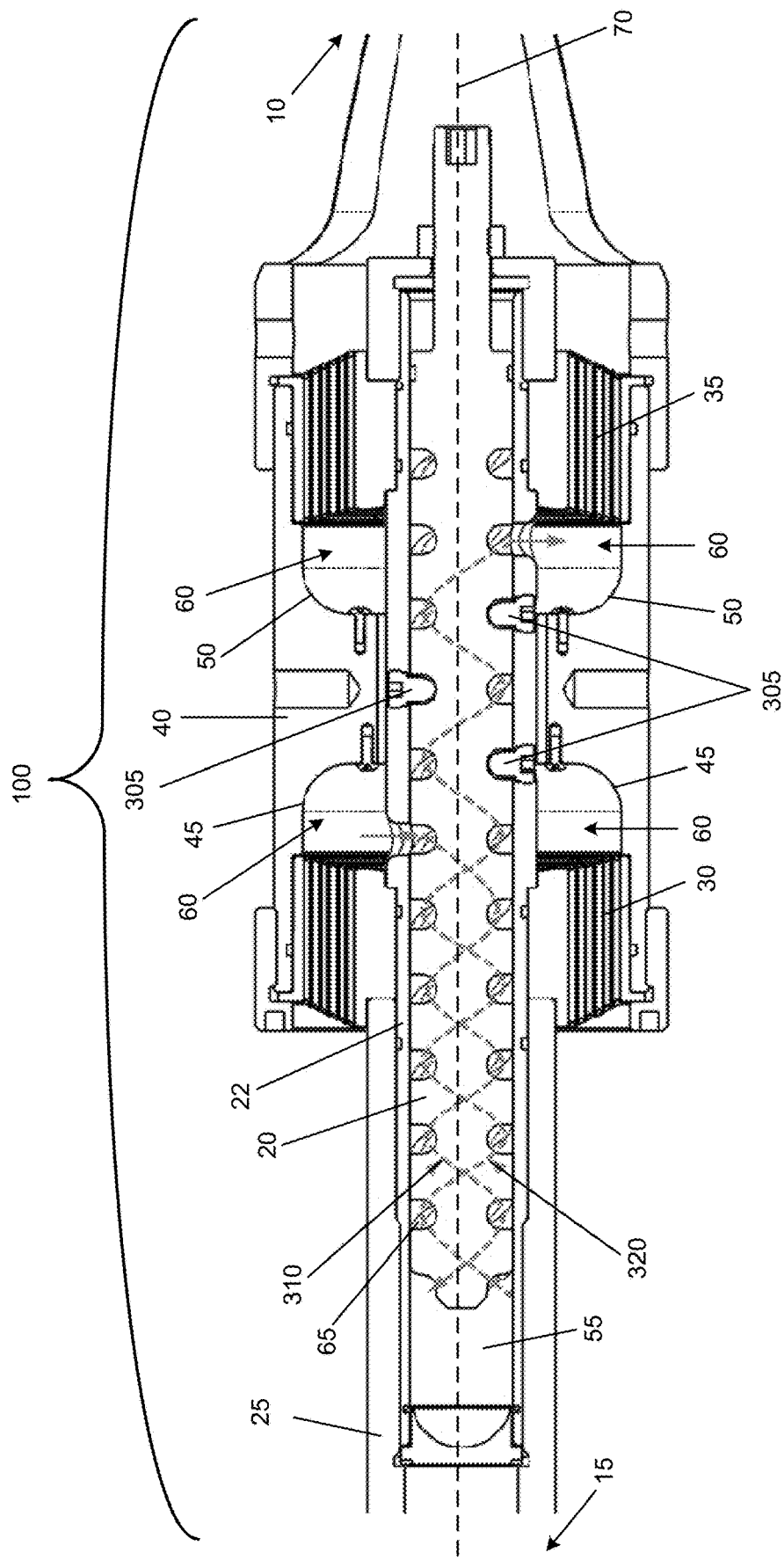
FIG. 3 is a side cutout view of a spiral inertia track vibration absorber.

FIG. 3 is a side cutout view of a spiral inertia track vibration absorber, arranged in accordance with at least some embodiments described herein. Those components in FIG. 3 that are labeled identically to components of FIGS. 1-2 will not be described again for the purposes of brevity.

A first spiral of flutes 65, defined by walls of inertia track body 20, may provide a first spiral inertia track 310 for fluid 60 to travel through. First spiral inertia track 310 may connect fluid reservoir 45 with inertia track fluid reservoir 55. Fluid 60 may flow in a first direction towards mobile end 15 through first spiral inertia track 310 from fluid reservoir 45 to inertia track fluid reservoir 55 when strut arm 25 is moved towards housing 40 along axis 70 of housing 40. Fluid 60 may flow in a second direction towards stationary end 10 from inertia track fluid reservoir 55 to fluid reservoir 45 when strut arm 25 is moved away from housing 40 along axis 70 of housing 40. Spiral inertia track vibration absorber 100 may include at least one stopper 305. Stopper 305 may be configured to seal off an end of first spiral inertia track 310 and prevent fluid 60 from flowing past stopper 305. Stopper 305 may contain fluid 60 within first spiral inertia track 310. A second spiral of flutes 65, defined by walls of inertia track body 20, may provide a second spiral inertia track 320 for fluid 60 to travel through. Second spiral inertia track 320 may connect fluid reservoir 50 with inertia track fluid reservoir 55. Fluid 60 may travel in the second direction towards stationary end 10 through second spiral inertia track 320 from inertia track fluid reservoir 55 to fluid reservoir 50 when strut arm 25 is moved towards housing 40 along axis 70 of housing 40. Fluid 60 may flow in the first direction towards mobile end 15 from reservoir 50 to inertia track fluid reservoir 55 when strut arm 25 is moved away from housing 40 along axis 70 of housing 40.

When strut arm 25 is moved towards housing 40 along axis 70 of housing 40, fluid 60 may start at fluid reservoir 45, flow along first spiral inertia track 310 to inertia track fluid reservoir 55, and flow along second spiral inertia track 320 from inertia track fluid reservoir 55 to fluid reservoir 50. Fluid 60 may absorb vibration as fluid 60 flows along and interacts with first spiral inertia track 310 and second spiral inertia track 320. Spiral inertia track 310 may be configured to channel the flow of fluid 60 along spiral inertia track 310 and fluid 60 may absorb vibration as fluid 60 flows along and interacts with spiral inertia track 310. Spiral inertia track 320 may be configured to channel the flow of fluid 60 along spiral inertia track 320 and fluid 60 may absorb vibration as fluid 60 flows along and interacts with spiral inertia track 320. A frequency of vibration absorbed by fluid 60 flowing along spiral inertia tracks 310 and 320 may be determined by an amount of distance traveled by fluid 60 along spiral inertia tracks 310 and 320. Fluid 60 flowing through flutes 65 may travel a total distance equal to a distance along first spiral inertia track 310 plus a distance along second spiral inertia track 320. A frequency of vibration absorbed by fluid 60 flowing along spiral inertia tracks 310 and 320 may be determined by a total mass of fluid 60 within spiral inertia tracks 310 and 320. Mass of fluid 60 within spiral inertia tracks 310 and 320 may be determined based on a density of fluid 60 and a volume of spiral inertial tracks 310 and 320 (cross sectional area of spiral inertia tracks 310 and 320 multiplied by the length of spiral inertia tracks 310 and 320). A total distance traveled by fluid 60 along first spiral inertia track 310 and second spiral inertia track 320 may determine a frequency of vibration absorbed by spiral inertia track vibration absorber 100.

Figure 4:
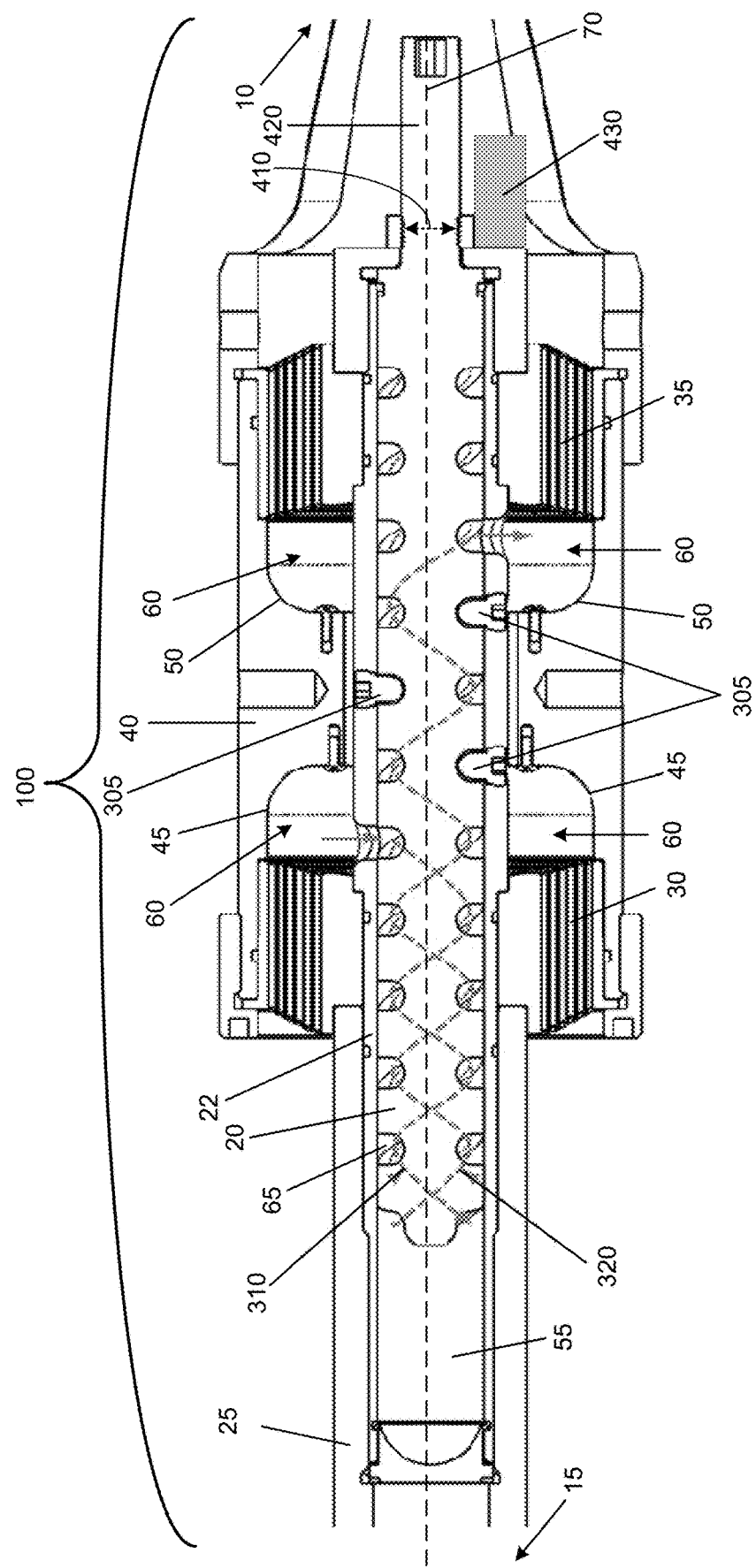
FIG. 4 is a side cutout view of a spiral inertia track vibration absorber.

FIG. 4 is a side cutout view of a spiral inertia track vibration absorber, arranged in accordance with at least some embodiments described herein. Those components in FIG. 4 that are labeled identically to components of FIGS. 1-3 will not be described again for the purposes of brevity.

A position of inertia track body 20 may be adjustable with respect to inertia track housing 22. Inertia track housing 22 may include walls which define an opening 410 at an end of inertia track housing 22. Inertia track body 20 may include a projection 420 which may project out from an end of inertia track housing 22 through opening 410. Projection 420 may secure a position of inertia track body 20 within inertia track housing 22 by interacting with opening 410. For example, an outer surface of projection 420 may include threads and opening 410 may include teeth. Teeth of opening 410 may engage with threads of projection 420 to position and secure inertia track body 20 within inertia track housing 22. A length of projection 420 that is outside of inertia track housing 22 may be adjusted by rotation of inertia track body 20 as teeth of opening 410 engage with threads of projection 420. Housing 40 may be configured to allow access to projection 420 and may be configured to allow for adjustment of a position of inertia track body 20 with respect to inertia track housing 22.

Spiral inertial track vibration absorber 100 may act as a tuned vibration absorber to isolate a vibration. An adjustment of a position of inertia track body 20 with respect to inertia track housing 22 may change an optimal frequency response of spiral inertial track vibration absorber 100. An adjustment of a position of inertia track body 20 with respect to inertia track housing 22 may tune spiral inertial track vibration absorber 100 to maximize vibration isolation performance of spiral inertial track vibration absorber 100. An adjustment of a position of inertia track body 20 with respect to inertia track housing 22 may be used to tune the performance to obtain desired results.

Spiral inertia track vibration absorber 100 may include a motor 430. Motor 430 may be within housing 40. Motor 40 may be configured to adjust a position of inertia track body 20 with respect to inertia track housing 22. Motor 430 may be an electric motor or an actuator. In an example, a look up table may be used to correlate performance with a position of inertia track body 20. Inertial track body 20 may be moved based on an aircraft's RPM and motor 40 may be part of an adaptive isolation system. An adaptive isolation system may move inertial track body 20 to achieve maximum performance automatically as RPM of an aircraft changes. An adaptive isolation system may include software to sense an RPM of an aircraft and the software may include an algorithm to determine movement and position of inertia track body 20 within inertial track housing 22.

Spiral inertia track vibration absorber 100 may be configured with projection 420 secured to opening 410 with a maximum amount of a length of projection 420 outside of inertia track housing 22. When a maximum amount of a length of projection 420 is outside of inertia track housing 22, inertia track body 20 may be positioned so that a total distance traveled by fluid 60 along first spiral inertia track 310 and second spiral inertia track 320 is minimized. When inertia track body 20 is positioned so that a total distance traveled by fluid 60 along first spiral inertia track 310 and second spiral inertia track 320 is minimized, a frequency of vibration absorbed by spiral inertia track vibration absorber 100 may be set to a maximum frequency.

FIG. 5 is a side cutout view of a spiral inertia track vibration absorber, arranged in accordance with at least some embodiments described herein. Those components in FIG. 5 that are labeled identically to components of FIGS. 1-4 will not be described again for the purposes of brevity.

As shown in FIG. 5, spiral inertia track vibration absorber 100 may be configured with projection 420 secured to opening 410 with a minimum amount of a length of projection 420 outside of inertia track housing 22. When a minimum amount of a length of projection 420 is outside of inertia track housing 22, inertia track body 20 may be positioned so that a total distance traveled by fluid 60 along first spiral inertia track 310 and second spiral inertia track 320 is maximized. When inertia track body 20 is positioned so that a total distance traveled by fluid 60 along first spiral inertia track 310 and second spiral inertia track 320 is maximized, a frequency of vibration absorbed by spiral inertia track vibration absorber 100 may be set to a minimum frequency.

A device in accordance with the present disclosure may provide a vibration absorber that is dynamically soft but statically stiff. A device in accordance with the present disclosure may provide a vibration absorber that is adjustable to a frequency of vibration desired to be absorbed. A device in accordance with the present disclosure may provide a vibration absorber with two spiral inertia tracks which may absorb a wider frequency range of vibration than a vibration absorber with a different track configuration. A device in accordance with the present disclosure may provide a vibration absorber that can be used in multiple applications as the vibration absorber presented is adjustable to a frequency of vibration desired to be absorbed.

FIG. 6 illustrates a flow diagram for an example process to absorb vibration, arranged in accordance with at least some embodiments presented herein. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Receive vibration to be absorbed". At block S2, vibration may be received by the vibration absorber. The vibration may be kinetic energy from a vibration of a machine or motor.

Processing may continue from block S2 to block S4, "Flow a fluid from a first fluid reservoir to an inertia track fluid reservoir along a first spiral inertia track, wherein the first spiral inertia track is defined by walls of an inertia track body, the first spiral inertial track is a spiral channel within an outer surface of the inertia track body, and the first spiral inertia track is configured to channel the flow of the fluid along the first spiral inertia track". At block S4, fluid within the vibration absorber may be flowed from a first fluid reservoir to an inertia track fluid reservoir. The fluid may flow along a first spiral inertia track. The first spiral inertial track may be a spiral channel within an outer surface of the inertia track body. The first spiral inertia track may be configured to channel the flow of the fluid along the first spiral inertia track.

Processing may continue from block S4 to block S6, "Flow the fluid from the inertia track fluid reservoir to a second fluid reservoir along a second spiral inertia track, wherein the second spiral inertia track is defined by walls of the inertia track body, the second spiral inertial track is a spiral channel within the outer surface of the inertia track body, and the second spiral inertia track is configured to channel the flow of the fluid along the second spiral inertia track". At block S6, fluid within the vibration absorber may be flowed from the inertia track fluid reservoir to a second fluid reservoir. The fluid may be flowed along a second spiral inertia track. The second spiral inertia track may be defined by walls of the inertia track body. The second spiral inertial track may be a spiral channel within the outer surface of the inertia track body. The second spiral inertia track may be configured to channel the flow of the fluid along the second spiral inertia track.

Processing may continue from block S6 to block S8, "Absorb the energy of the vibration by a combination of the flowing of the fluid along the first spiral inertial track, flowing of the fluid along the second spiral inertial track, and interacting the fluid with the first fluid reservoir, the inertial track fluid reservoir, and the second fluid reservoir". At block S8, the vibration may be absorbed by the combination of the flow of the fluid along the first spiral inertial track, the flow of the fluid along the second spiral inertial track, and interacting the fluid with the first fluid reservoir, the inertial track fluid reservoir, and the second fluid reservoir Vibration may be absorbed by the interaction of forces between the fluid with the first spiral inertia track, the second spiral inertia track, the first fluid reservoir, the inertial track fluid reservoir, and the second fluid reservoir.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device to absorb vibration, the device comprising:
a housing, wherein a first end of the housing is attachable and removable from a static object or structure;
an inertia track housing within the housing, wherein the inertia track housing includes at least one opening at a longitudinal end;
an inertia track fluid reservoir, wherein the inertia track fluid reservoir is within the inertia track housing;
an inertia track body, wherein the inertia track body is within the inertia track housing, the inertia track body includes walls, and the walls define a first spiral inertia track and a second spiral inertia track within an outer surface of the inertia track body, wherein the first spiral inertia track and the second spiral inertia track are spiral channels within the outer surface of the inertia track body, the first spiral inertia track connects a first fluid reservoir with the inertia track fluid reservoir, the second spiral inertia track connects a second fluid reservoir with the inertia track fluid reservoir, the first spiral inertia track is configured to channel the flow of a fluid along the first spiral inertia track, the second spiral inertia track is configured to channel the flow of the fluid along the second spiral inertia track, and a combination of the flow of the fluid along the first spiral inertial track, the flow of the fluid along the second spiral inertial track, and an interaction of the fluid with the first fluid reservoir, the inertial track fluid reservoir, and the second fluid reservoir, is effective to absorb the vibration; and
a motor within the housing, wherein the motor is attached to an exterior surface of the inertia track housing in a vicinity of the at least one opening and is configured to adjust a position of the inertia track body with respect to the inertia track housing.

2. The device of claim 1, further comprising at least one stopper, wherein the at least one stopper is configured to seal off an end of the first spiral inertia track and prevent the fluid from flowing past the stopper.

3. The device of claim 1, further comprising:
a first plunger seal, wherein the first plunger seal is housed within the housing;
a second plunger seal, wherein the second plunger seal is housed within the housing;
the first fluid reservoir, wherein walls of the housing define the first fluid reservoir and the first fluid reservoir is adjacent to the first plunger seal;
the second fluid reservoir, wherein walls of the housing define the second fluid reservoir and the second fluid reservoir is adjacent to the second plunger seal;
a strut arm, wherein a first end of the strut arm is secured to the first plunger seal and a second end of the strut arm is attached to a mobile end; and
wherein the inertia track housing is attached to inner edges of the first plunger seal and inner edges of the second plunger seal and the inertia track housing is in contact with the strut arm.

4. The device of claim 3, further comprising the fluid, wherein the first fluid reservoir, the second fluid reservoir, the inertia track fluid reservoir, the first spiral inertia track, and the second spiral inertia track hold the fluid.

5. The device of claim 4, wherein the fluid is a hydraulic fluid.

6. The device of claim 4, wherein the fluid is effective to flow in a first direction, towards the mobile end of the strut arm, through the first spiral inertia track, from the first fluid reservoir to the inertia track fluid reservoir, and in a second direction, towards a stationary end of the strut arm, from the inertia track fluid reservoir to the second fluid reservoir.

7. The device of claim 3, wherein the first plunger seal and the second plunger seal are elastomeric bearings.

8. The device of claim 3, wherein the housing is configured to allow access to the inertia track body to adjust a position of the inertia track body with respect to the inertia track housing.

9. A method for absorbing vibration, the method comprising:
  receiving vibration to be absorbed;
  flowing a fluid from a first fluid reservoir to an inertia track fluid reservoir along a first spiral inertia track, wherein the first spiral inertia track is defined by walls of an inertia track body, the first spiral inertial track is a spiral channel within an outer surface of the inertia track body, and the first spiral inertia track is configured to channel the flow of the fluid along the first spiral inertia track;
  flowing the fluid from the inertia track fluid reservoir to a second fluid reservoir along a second spiral inertia track, wherein the second spiral inertia track is defined by walls of the inertia track body, the second spiral inertial track is a spiral channel within the outer surface of the inertia track body, and the second spiral inertia track is configured to channel the flow of the fluid along the second spiral inertia track;
  absorbing the energy of the vibration by a combination of the flowing of the fluid along the first spiral inertial track, flowing of the fluid along the second spiral inertial track, and interacting the fluid with the first fluid reservoir, the inertial track fluid reservoir, and the second fluid reservoir; and
  adjusting a position of the inertia track body with respect to an inertia track housing that contains the inertia track body through a motor within a housing that contains the inertia track housing, wherein a first end of the housing is attachable and removable from a static object or structure, and the motor is attached to an exterior surface of the inertia track housing in a vicinity of the at least one opening at a longitudinal end of the inertia track housing.

10. The method of claim 9, wherein the fluid is a hydraulic fluid.

11. The method of claim 9, wherein first spiral inertia track includes a stopper to seal off an end of the first spiral inertia track and prevent the fluid from flowing past the stopper.

12. The method of claim 9, further comprising:
  flowing the fluid from the inertia track fluid reservoir to the first fluid reservoir along the first spiral inertia track; and
  flowing the fluid from the second fluid reservoir to the inertia track fluid reservoir along the second spiral inertia track.

13. The method of claim 9, wherein a length of the first spiral inertia track and a length of the second spiral inertia track are adjustable.

14. The method of claim 13, wherein the length of the first spiral inertia track and the length of the second spiral inertia track are adjustable by the motor.

* * * * *